Feb. 18, 1941.  A. RICHARDSON  2,232,633
PIE DOUGH CUTTER
Filed Feb. 29, 1940  2 Sheets-Sheet 1

Inventor
Alice Richardson

Feb. 18, 1941.  A. RICHARDSON  2,232,633
PIE DOUGH CUTTER
Filed Feb. 29, 1940   2 Sheets-Sheet 2

Inventor
Alice Richardson
By L. F. Laudneth
Attorney

Patented Feb. 18, 1941

2,232,633

UNITED STATES PATENT OFFICE 2,232,633

PIE DOUGH CUTTER

Alice Richardson, Phoenix, Ariz.

Application February 29, 1940, Serial No. 321,577

10 Claims. (Cl. 107—15)

This invention relates to an improved construction of machine for cutting off excess portions of top and bottom layers of pie dough from a plurality of pie tins, simultaneously and is intended and adapted for use in conjunction with my co-pending application for pie dough press, which machines, are employed to prepare a plurality of pie tins for baking.

More particularly, it is an aim of this invention to provide a pie dough cutter especially designed and adapted for use with small pie dough tins, sold in bakeries, to enable a plurality of tins to be prepared simultaneously for baking to thereby reduce the expense involved in the production of the individual pies.

Still another aim of the invention is to provide an improved construction of multiple pie tins including a plate, to one side of which is secured a plurality of pie tins, in spaced apart relationship relatively to each other, so that the tins may be handled as a unit for baking and for preparing simultaneously the individual tins for the oven.

Still another aim of the invention is to provide a pie dough cutter for use in conjunction with the multiple pie tins having means whereby the plate may be readily guided to a certain position in the machine to position the individual tins to be engaged by cutting members, which, in a single operation, remove the excess dough from the outer edges of the rims thereof.

Figure 1:
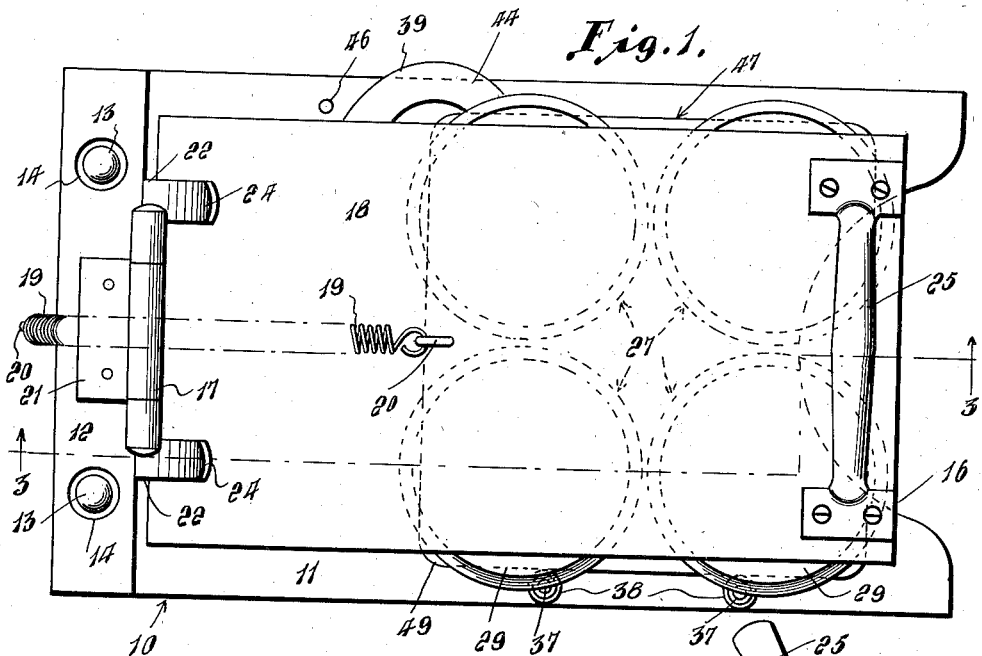
Figure 2:
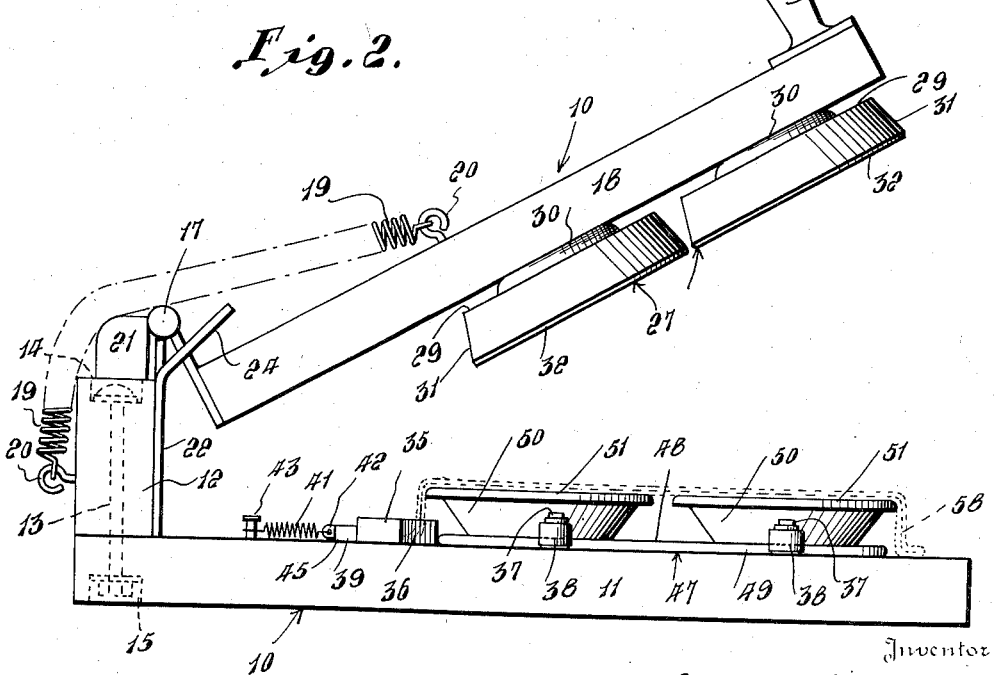
Figure 3:
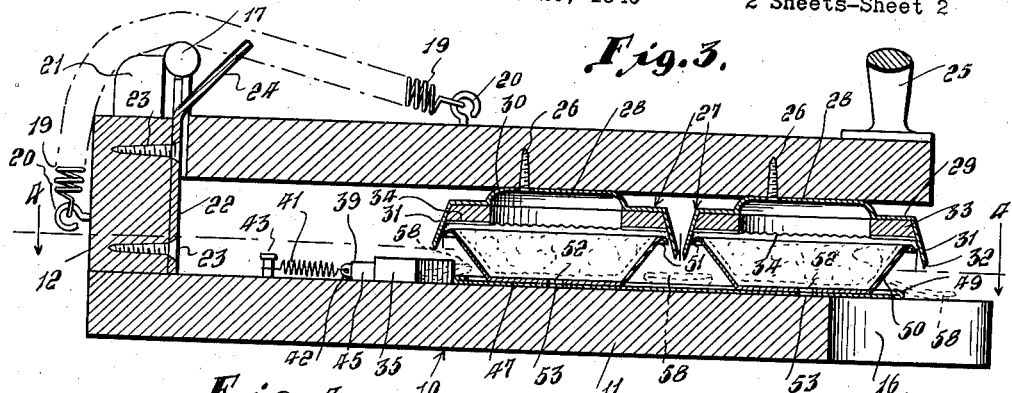
Figure 4:
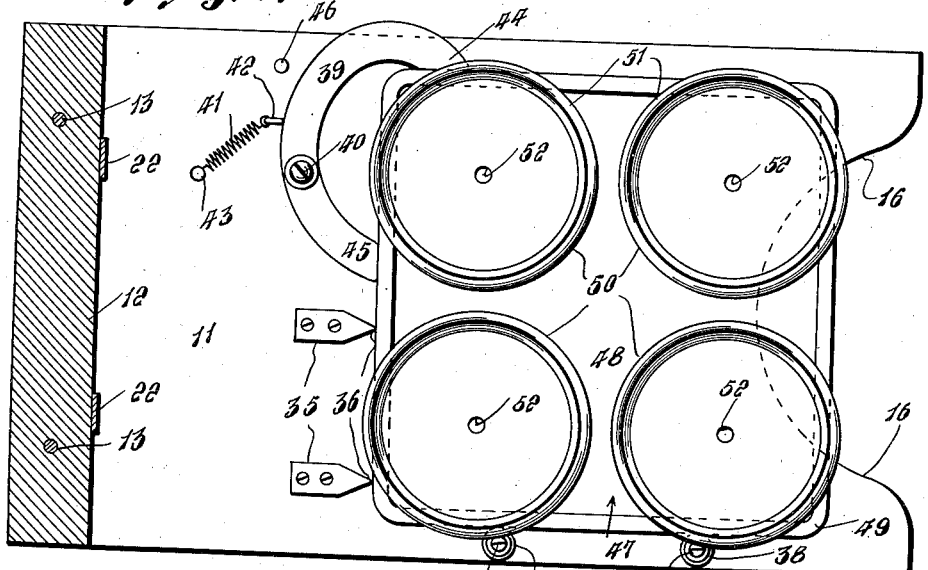
Figures 5, 6:
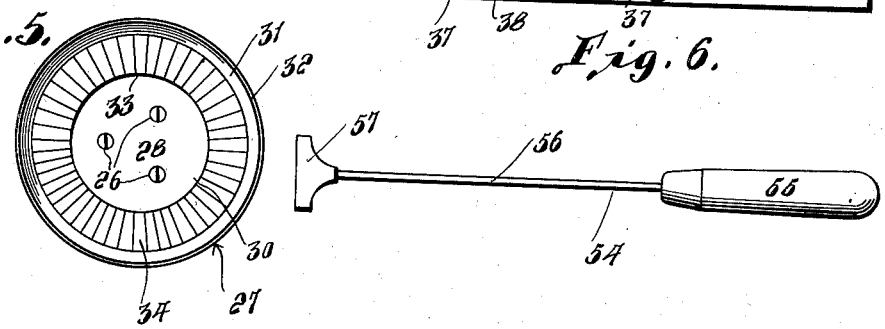

Other objects and advantages of the invention will hereinafter become more fully apparent from the following description of the drawings, which illustrate a preferred embodiment thereof, and wherein:

Figure 1 is a top plan view of the pie dough cutter with the multiple pie tins positioned therein, Figure 2 is a side elevational view of the same showing the cover in a raised, open position, Figure 3 is a longitudinal vertical sectional view taken substantially along the plane of the line 3—3 of Figure 1, Figure 4 is a horizontal sectional view taken substantially along the plane of the line 4—4 of Figure 3, Figure 5 is a bottom plan view of one of the cutting elements, and Figure 6 is a top plan view of the scraping tool.

Referring more particularly to the drawings, wherein like reference characters designate like or corresponding parts throughout the different views, 10 designates generally the pie dough cutting machine including a base member 11 which is provided with an upwardly extending wall 12, at one end thereof, secured thereto by means of the nut and bolt fastenings 13. As best seen in Figure 2, the heads of the bolts of the fastenings 13 are countersunk in recesses 14 in the top surface of the wall 12 while the nuts and shank ends of the fastenings 13 are countersunk in recesses 15 in the bottom surface of the base member 11. The opposite end of the base member 11 is recessed at 16, for a purpose which will hereinafter become apparent.

A hinge 17 has one leaf depending downwardly therefrom and secured to the inner side of the end wall 12 and its other leaf secured to one end of a cover plate 18 for hingedly connecting the cover plate to the end wall 12. A contractile coil spring 19 is secured by means of eye screws 20, at one end to the wall 12, on the outer side thereof, and at its opposite end to the upper side of the cover plate 18, intermediate of its ends. A block 21 is secured to and rises from the upper edge of the wall 12 to be engaged by the spring 19 to hold it out of frictional engagement with the hinge 17. A pair of metal straps 22 are secured by means of screw fastenings 23 to the inner edge of the wall 12, one on either side of the hinge 17, and are provided with upper free ends which are bent to project obliquely toward the free end of the cover plate 18 to form abutment members 24 to limit the upward movement of the cover plate 18. The opposite free end of the cover plate 18, is provided with a handle 25 secured, at its ends, to the upper side thereof and by means of which the cover 18 may be swung downwardly against the action of the spring 19 until its connected edge abuts against the straps 22, as seen in Figure 3, at which time it will be disposed substantially parallel to the base member 11.

Secured to the underside of the cover plate 18, and adjacent its free end, by means of a plurality of screw fastenings 26, are a plurality of dough cutters 27, which, as best seen in Figure 1, are disposed in spaced apart relationship relatively to each other, for a purpose which will hereinafter become apparent. Referring particularly to Figures 3 and 5, the dough cutters 27 each include a center portion 28 through which extend the fastenings 26 and which is disposed against the underside of the cover plate 18. An annular portion 29 is offset downwardly from the center portion 28 by means of the annular arcuately shaped portion 30. The outer edge of the annular portion 29 is provided with a depending outwardly flared annular flange or apron 31, the bottom edge of which, as best seen in Figure 2, is beveled on its outer side to form an annular cutting edge 32. The annular portion 29 forms a seat for a ring 33 which is secured thereto, in any suitable manner, not shown, and which is provided on its bottom edge with the serrated surface 34, for a purpose which will hereinafter be described.

Referring particularly to Figure 4, the upper surface of the base member 11 is provided with a pair of spaced transversely disposed abutment members 35, which are fixedly secured thereto and which are provided with tapered ends 36, extending toward the free end of the base member 11. Along one edge of its upper surface, the base member 11 is provided with a pair of spaced upwardly projecting posts 37 on which are journaled rollers 38. The rollers 38 are disposed in longitudinally spaced apart relationship relatively to each other and between the abutments 35 and the free edge of the base member 11. An arcuately shaped abutment member 39 is pivotally connected to the upper surface of the base member 11, adjacent one of its ends, by means of the headed fastening 40. A contractile coil spring 41 is connected at one end to an eyelet 42 secured to the abutment member 39 on its outer edge and between the pivot fastening 40 and its remote end, while the opposite end of the contractile spring 41 is secured to a pin 43 mounted in the upper surface of the base member 11. The spring 42 acts to urge the end 44 of the member 39, which is remote to the pivot 40, toward a retracted position, or toward the end wall 12, to move the opposite end 45 of the member 39 away from the end wall 12. A stop 46 is disposed to engage the outer edge of the member 39 to limit the swinging movement of the member 39 in the aforementioned direction.

A multiple pie tin unit, designated generally 47, includes a plate 48 having a rolled edge 49, and on one side of which is disposed a plurality of pie tins 50, the bottoms of which are secured to the plate 49, in any suitable manner, not shown, so that they will be spaced relatively to one another in the same manner as the dough cutters 27. The pie tins 50 are provided with curved annular rims 51 and in their bottoms are provided with openings 52 to register with openings 53 in the plate 48.

A dough scraper 54, as seen in Figure 6, includes a handle 55, to one end of which is secured an end of a shank 56 which is provided at its opposite end with a relatively wide scraping edge 57.

The vent openings 52 and 53 provide for the release of air from tins 50 when the bottom layer of dough is pressed into the tins, as more fully described in the previously referred to copending application.

A sheet of dough, as seen in dotted lines in Figure 2, is placed over the four tins 50 and portions thereof are pressed into each of the tins, as more fully explained in my aforementioned copending application. After which the four recesses thus formed are filled with a pie filler and a second sheet of dough then placed thereover. The multiple pie tin unit 47 is then placed on the base member 11, adjacent its free end and moved inwardly thereof to cause one end of said member to engage end 45 to retract said end until the end of the member 47 contacts the tapered ends of the abutments 35, at which time end 44 will have been swung to a fully projected position to engage a side edge of the plate 48 to move its opposite side edge into engagement with the rollers 38. In this position, the member 47 can be held by the operator who grasps the opposite end thereof with the fingers disposed in the recess 16 while the other hand is used to grasp the handle 25 to swing the cover 18 downwardly against the action of the spring 19 to cause the flanges 31 to each engage over a rim 51 of one of the pie tins 50 to cut the excess dough of the two sheets thereof which dough, as seen in dotted lines in Figure 3, at 58 is entirely separated from the tins 50. The serrated surfaces 34 contact the marginal portions of the two layers of dough, which are disposed on the rims 51 to crimp these portions together, after which the handle 25 is released to permit the spring 19 to swing the cover plate 18 back to the position, as seen in Figure 2, after which the multiple pie tin unit 47 may be removed and placed in an oven, not shown, for baking, and the cutting operation repeated on another unit 47 which has been similarly prepared.

The tool 54 is designed and adapted for use for removing the excess dough 58 from the upper surface of the plate 48 and between the pie tins 50, the shank 56 being sufficiently small in diameter to pass between the rims 51 as the dough is scraped off by the head 57.

Various modifications and changes are contemplated and may obviously be resorted to as only a preferred embodiment of the invention has been disclosed.

I claim as my invention:

1. A device of the class described comprising a base member, a wall rising from one end thereof, a cover hinged to the upper edge of said wall swingable in a vertical plane, said cover being disposed above and substantially parallel to the base member when in a lowered position, means on the upper surface of said base member for automatically directing a plurality of pie tins into a certain position, and cutter means secured to the underside of said cover for engaging the rims of said pie tins for cutting excess dough therefrom.

2. A device as in claim 1, comprising a coil spring connected at one end to said end wall and at its opposite end to the cover for normally urging the cover upwardly to an open position, and abutment members or stops carried by said end wall and projecting obliquely therefrom for limiting the upward movement of the cover.

3. A device as in claim 1, said cutter means including a base portion secured to the underside of said cover and provided with annular, depending diverging flanges for engaging over the rims of the pie tins for cutting overhanging dough therefrom, and each of said cutters being provided with a ring secured to the underside of its base portion and having a corrugated surface for engaging the rim of a pie tin for crimping dough thereon.

4. A pie dough cutter comprising a base member having a wall rising from one end thereof, a cover hingedly connected to said wall and disposed above and substantially parallel to said base member when in a lowered position, means on the upper surface of said base member for automatically directing a plurality of pie tins into a certain position relatively thereto when inserted thereon in a direction toward the wall, and cutter members secured to and depending from the cover for engaging over said pie tins for cutting pie dough from the outer edges of the rims thereof.

5. A device as in claim 4, said means including a pair of spaced abutment members disposed transversely of the base member, and a pair of rollers disposed longitudinally of the base member and adjacent one edge thereof, said rollers being disposed substantially in a plane at right angles to the plane of said abutment members and between said abutment members and the opposite end of the base member.

6. A device as in claim 4, each of said cutting members comprising an inverted cup shaped element secured to the underside of the cover, said cup shaped element having a depending annular diverging flange for engaging over the rim of one of the pie tins for cutting the dough therefrom.

7. A pie dough cutting machine comprising a base member having a wall rising from one end thereof, a cover hingedly connected to said wall and disposed over said base member and in substantially parallel spaced relationship thereto, when in a lowered position, the upper surface of said base member being provided with a pair of spaced transversely disposed abutment members having pointed abutment ends, a pair of spaced longitudinally disposed rollers adjacent one longitudinal edge thereof and between said abutment members and the free end of said base member, an arcuately shaped abutment member pivotally connected to said base member adjacent one end thereof and provided with a contractile coil spring for urging its elongated end toward said end wall; a plate provided with a plurality of pie tins secured to its upper side in spaced apart relationship relatively to each other, said plate being insertable onto said base member to engage the opposite end of said arcuately shaped abutment member to retract said end until one end of said plate contacts the sharpened ends of said abutment members, the opposite end of said pivotally mounted abutment member being rocked thereby into engagement with one of the side edges of said plate for moving the opposite side edge thereof into engagement with said rollers; and cutting members secured to the underside of said cover, in spaced apart relationship relatively to each other, said cutting members being disposed to engage over the rims of the pie tins for removing the excess dough therefrom.

8. A device as in claim 7, each of said cutting members including a ring having a serrated bottom surface for engaging and crimping the pie dough on the rims of the pie tins.

9. A device as in claim 7, comprising a contractile coil spring connected at one end to said end wall and at its opposite end to said cover for normally urging the cover upwardly, and a stop projecting obliquely from the upper edge of said end wall for limiting the upward movement of said cover.

10. A device as in claim 7, comprising a scraping tool having a shank portion provided with a T-shaped head at its free end for removing the excess pie dough disposed on the plate and between the pie tins.

ALICE RICHARDSON.